US007366995B2

(12) United States Patent
    Montague

(10) Patent No.: US 7,366,995 B2
(45) Date of Patent: Apr. 29, 2008

(54) COMBINATION TOOL THAT ZOOMS IN, ZOOMS OUT, PANS, ROTATES, DRAWS, OR MANIPULATES DURING A DRAG

(76) Inventor: Roland Wescott Montague, 8915 Lochside Drive, North Saanich, B.C. (CA) V8L 1N1

( * ) Notice: Subject to any disclaimer, the term of this patent is extended or adjusted under 35 U.S.C. 154(b) by 434 days.

(21) Appl. No.: 11/045,814

(22) Filed: Jan. 31, 2005

(65) Prior Publication Data

US 2005/0168488 A1    Aug. 4, 2005

Related U.S. Application Data

(60) Provisional application No. 60/541,015, filed on Feb. 3, 2004.

(51) Int. Cl.
    *G06F 15/00* (2006.01)
    *G06F 13/00* (2006.01)
(52) U.S. Cl. ...................... 715/798; 715/769
(58) Field of Classification Search ............. 715/810, 715/765, 850–853, 700, 834, 798, 769, 788
    See application file for complete search history.

(56) References Cited

U.S. PATENT DOCUMENTS 5,528,289 A * 6/1996 Cortjens et al. ......... 348/211.9

| 5,615,384 A | 3/1997 | Allard |
| 6,052,110 A | 4/2000 | Sciammarella |
| 6,356,256 B1 | 3/2002 | Leftwich |
| 6,618,063 B1 | 9/2003 | Kurtenbach |
| 2004/0100479 A1* | 5/2004 | Nakano et al. ............. 345/700 |
| 2005/0144567 A1* | 6/2005 | Kurtenbach et al. ........ 715/810 |

* cited by examiner

*Primary Examiner*—Cao (Kevin) Nguyen

(57) ABSTRACT

After positioning the cursor and pressing-and-holding a mouse button to begin a drag, a user continues to drag the cursor out of and into plural popped up regions. While the cursor is within a region, an associated function effects the displayed graphical information in a particular way, such as continuously panning, drawing, zooming, or rotating. Upon rolling-out of a region without entering a contiguous region, the last function continues to execute and all popped up regions are removed such that the user may utilize the entire display without being switched to another function. In a simple form, after release of the mouse button, a tool may zoom out if the user held the mouse substantially stationary and zoom in on a rectangle if the mouse was dragged. Reducing the number of times a user clicks by eliminating the step of selecting a function should help avoid repetitive strain injuries.

22 Claims, 9 Drawing Sheets and three subregions defined relative to the reference-point and three subregions defined relative to the reference-point and relative to the display window's origin and boundaries.

COMBINATION TOOL THAT ZOOMS IN, ZOOMS OUT, PANS, ROTATES, DRAWS, OR MANIPULATES DURING A DRAG

CROSS REFERENCE TO RELATED APPLICATIONS

This application claims the benefit of PPA Ser. No. 60/541,015, filed 2004 Feb. 3 by the present inventor.

FEDERALLY SPONSORED RESEARCH

Not Applicable

SEQUENCE LISTON OR PROGRAM

Not Applicable

BACKGROUND OF THE INVENTION

The present invention relates to graphical user interfaces, and more particularly to methods of combining user interfaces, such as zooming in/out, panning, rotating, drawing, selecting, manipulating, etc., for a graphics display.

Within the prior art, a user may zoom in a graphical display by drawing a rectangle around an area of interest. A common "zoom-in" function is to click-and-hold to define the position of one corner of the rectangle; drag the mouse, pen, trackball, or finger to stretch the opposite corner to the desired shape and size; then drop or un-click to complete the action. The mentioned sequence results in the magnification of the graphical objects inside the rectangle. That is, the area of interest fills the entire display.

In order to increase productivity, and to help avoid repetitive strain type injures, there remains a need to zoom out without requiring the user to activate a separate zoom-out function, such as an action involving a keyboard, menu, tool bar icon, or click of alternate buttons on the mouse or pen.

There remains a need to pan, zoom in/out by alternate methods, rotate, adjust image attributes, sectional cut positions, time axis, or data sets displayed in a graph, etc., without requiring the user to activate a separate function by an additional click, drag, or keyboard press action.

BRIEF SUMMARY OF THE INVENTION

In the present invention, after positioning the cursor and pressing-and-holding a mouse button (left or right) to begin a drag, the user continues to drag the cursor within regions that are defined relative to the starting point of the drag. Each region has an associated function that typically utilizes the starting point of the drag and the current position of the cursor, as well as, the held state of the mouse's button or whether the button was released once or multiple times.

Utilizing the methods in the present invention, combination zoom and pan; zoom and rotate; zoom and draw; zoom and pan and rotate; type tools may be created with multiple active regions that have borders defined relative to the starting point of a drag. While the cursor is drug within one of the large regions, the associated function may be effecting the displayed graphical information in a particular way. One region may zoom, a second region may dynamically pan, and a third region may rotate the viewpoint of the display. A graphic depicting some of the active regions appears and may be substantially translucent to allow the user to see the graphics on the display screen. To avoid distraction, an advanced user may utilize a setting that prevents the mentioned graphic from appearing immediately; the graphic will appear if the user presses-and-holds without dragging for a short duration, such as one second.

Some functions that effect the displayed information in a particular way are zooming in, zooming out, panning, rotating, stretching, skewing, adjusting image attributes (such as contrast and hue), adjusting 3d section cut positions, displayed animation/video frame, graphed data, drawing circles/lines/curves/rectangles/text, selecting, copying, etc. The mentioned list is intended to increase understanding and not to limit the number of possible functions.

In addition to the regions defined relative to the starting point of a drag, stationary regions defined relative to the display windows origin and boundaries may be specified. Such fixed regions may pan one screen width, pan all the way, rotate the viewpoint (rotate in 3d) by 90 degrees, etc.

In another aspect of the present invention, the method involves dynamically zooming in/out about the point defined at the start of the drag rather than the center of the display.

In another aspect of the present invention, the method involves double releasing at the end of a drag to achieve alternate results.

Further utilizing methods in the present invention, the user may drag and "roll-out" (vs. "roll-off") of a particular function's region to "lock" the function "on" for the rest of the drag; The user may then continue the same drag backward through previously defined regions, while the initially activated function effects the displayed graphical information in a particular way.

A possible function may be a another combination tool with new functions and regions that, after activated and displayed at the reference point, the user may continue to drag the cursor back over and then "roll-out" of, or release the button on top of, one of the new function's regions to activate another function.

Further in the present invention, if, during a drag, the cursor becomes motionless for a long duration (5 seconds) within any function's region, a pop-up menu of additional functions appears; The user then continues the drag and releases the mouse button within the pop-up menu on a desirable-new-function. The mentioned desirable-new-function then replaces the original function in that region; thereby, the next time the user presses the mouse button, the combination tool now comprises the desirable-new-function. Alternately, if the user "rolled-out" of the pop-up menu's desirable-new-function, the desirable-new-function immediately activates with the current drag and does not replace the original function the next time the user presses-and-holds the mouse button.

Other novel features of the present invention are apparent from the summary, detailed description, claims, and attached drawings, hereinbelow.

BRIEF DESCRIPTION OF THE DRAWINGS

In drawings which help illustrate the present invention.

In all figures, like reference numerals represent the same or identical components of the present invention.

DETAILED DESCRIPTION OF THE INVENTION

Figure 1:
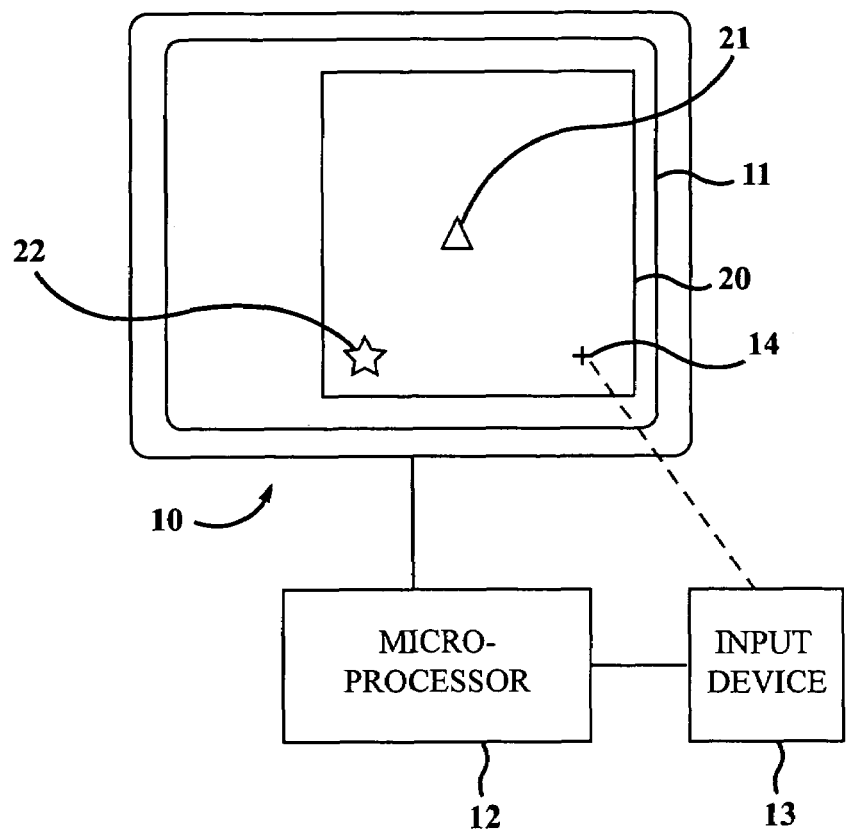
FIG. 1 shows a microprocessor, a display, and an input device.

FIG. 1 shows a computer's or hand-held-device's display 10 that comprises a viewable portion 11 (a so-called screen) that comprising a window 20 that displays graphical objects 21, 22. The graphical objects may be operations such as starting an application, zooming in, or activating a draw tool. Alternately, some graphical objects may communicate or create information, such as photographs, images, video's, animations, graphs, text, CAD drawings, 3d solids, games, etc. A cursor 14 is movable by an input device 13, such as a mouse or touch screen, operated by a user; The input device 13 communicates with a microprocessor 12; The microprocessor 12 controls how graphical objects 21, 22 are displayed, changed, or added, in the display window 20. It will be appreciated that other programmable controllers may be programmed to carry out the present invention and may be a dedicated system having a screen for displaying graphical object including text, graphs, images, etc; The input device 13 and at least one programmable controller for carrying out various functions in the system are used to manipulate those graphical objects. The present invention may be implemented on a general-purpose personal computer, cell phone, personal digital assistant, global positioning system, electronic measuring device, video surveillance system, radar system, video recorder, television, game station, etc.; with an input device, such as a touch-screen, mouse, touch pad, track ball, light-pen, joystick, remote control device, etc.; and a display means, such as a LCD, plasma display, LED display, monitor, etc.

Figure 2:
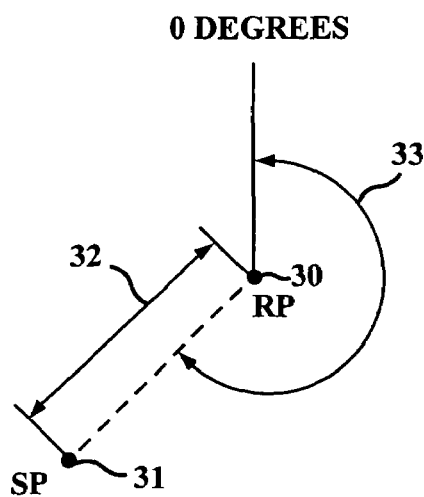
FIG. 2 depicts the definition of a reference-point and a selection-point during a drag.

According to one aspect of the present invention, the user defines two points with the input device 13. In FIG. 2, the location of the first point, namely the reference-point 30, is defined when the user moves the cursor 14 to an arbitrary location and presses-and-holds a button on the input device 13 or the user touches-and-holds an arbitrary location on the touch screen. The location of the second point, namely the selection-point 31, is defined as the current position of the cursor 14 as the user continues to drag a mouse, finger or stylus. One of the more than two (three, four?) functions, that effect the displayed information in a particular way, utilizes the co-ordinates of the two mentioned points. The functions are divided into (one?) two or more groups. The selection of one of the groups occurs when the distance 32 between the reference-point 30 and the selection-point 31 falls within a predetermined range defined for each said group. The selection and activation of one of the functions within the selected group occurs when the angular bearing 33 between the reference-point 30 and the selection-point 31 falls within a predetermined range defined for each said function.

Figure 3:
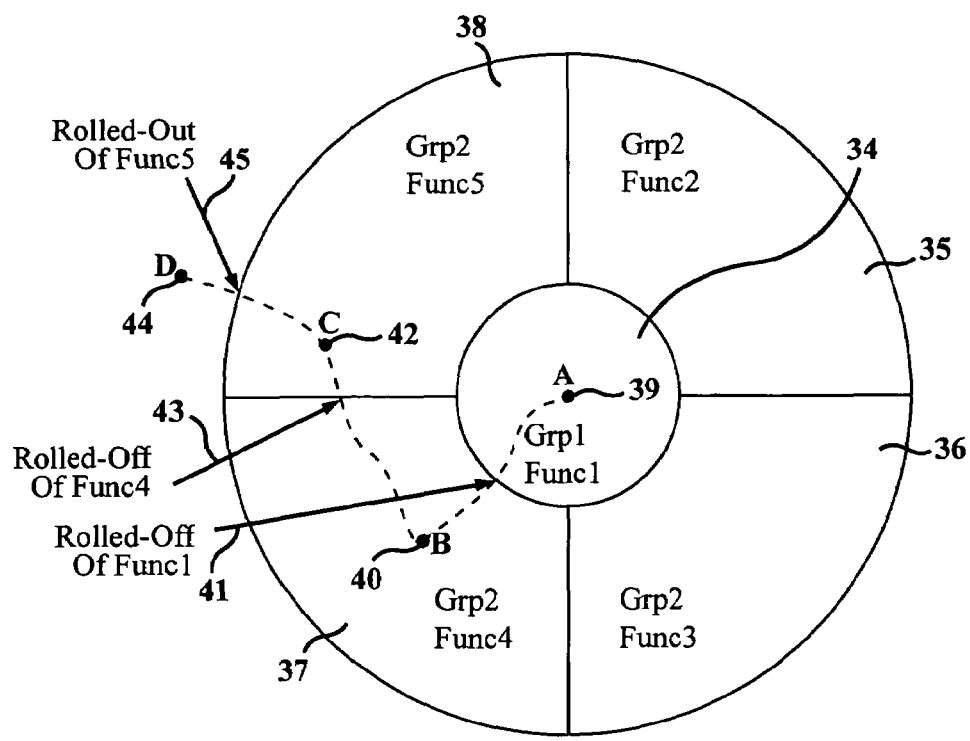
FIG. 3 shows a combination tool example of five functions in two groups.

In an example of five functions in two groups, FIG. 3 depicts the boundaries of the ranges defined relative to a reference-point 30 located at point A 39. The first group, namely Grp1, contains Func1. The second group, namely Grp2, contains Func2, Func3, Func4, and Func5. The area within the boundaries for particular function is defined as that function's region 34, 35, 36, 37, 38, and may also be worded as the region of the function.

Further, in FIG. 3, when the user moves the selection-point 31 to point B 40, the Func4 function is selected and activates. Along the way from point A 39 to point B 40, the user is said to have "rolled-off" 41 of the Func1 function's region 34 because the selection-point 31 immediately entered a contiguous region 37 that is associated with a function. Similarly, if the user continues to move the selection-point 31 from point B 40 to point C 42, along the way the selection-point 31 "rolls-off" 43 of the Func4 function's region 37 when entering the Func5 function's region 38. Alternately, if the user continues to move the selection-point 31 from point C 42 to point D 44, along the way the selection-point 31 is said to have "rolled-out" 45 of the Func5 function's region 38 because the selection-point 31 did not enter a contiguous (bordering) region that is associated with a function. Please note the difference between "rolled-off" 43 and "rolled-out" 45.

Defining a function's boundaries on a distance 32 and angular bearing 33 is not required. Any arbitrarily shaped region, such as a polygon or peanut like shape, may be defined for each function. A linear system of ten rectangles stacked on top of each other also fits within this definition. A particular function is selected and activates when the selection-point 31 is contained within one of that function's associated regions.

Figure 4:
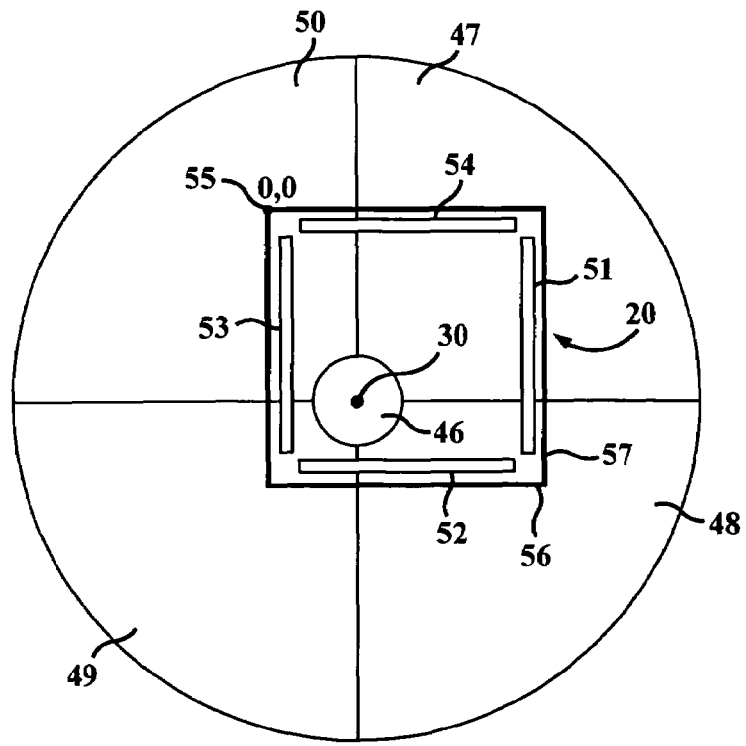
FIG. 4 shows regions defined relative to the reference-point and relative to the display window's origin and boundaries.

Referring to FIG. 4, some of the arbitrarily shaped regions 46, 47, 48, 49, 50 are defined relative to the drag's reference-point 30; whereas, other regions 51, 52, 53, 54 may be defined relative to (and fixed to) the display window's 20 origin 55 and boundaries 56, 57.

Regions 51, 52, 53, 54 that are defined relative to the display window's 20 origin 55 and boundaries 56, 57 override other regions 46, 47, 48, 48, 49, 50 that are defined relative to the drag's reference-point 30. The fixed regions 51, 52, 53, 54, if any, may typically be located substantially close to the boundaries 56, 57 of the display window 20.

A function often comprises a number of actions that effect the displayed information in a particular way. Which one of the function's actions activates, depends on the state of the input device's 13 button, and whether at the end of a drag the button was released, released-pressed-released in quick succession (namely double-released or R-P-R), released-pressed-released-pressed-released (namely triple-released or R-P-R-P-R), or released-pressed-released-pressed-released-pressed-released (namely quadruple-released or R-P-R-P-R-P-R).

Figure 5A:
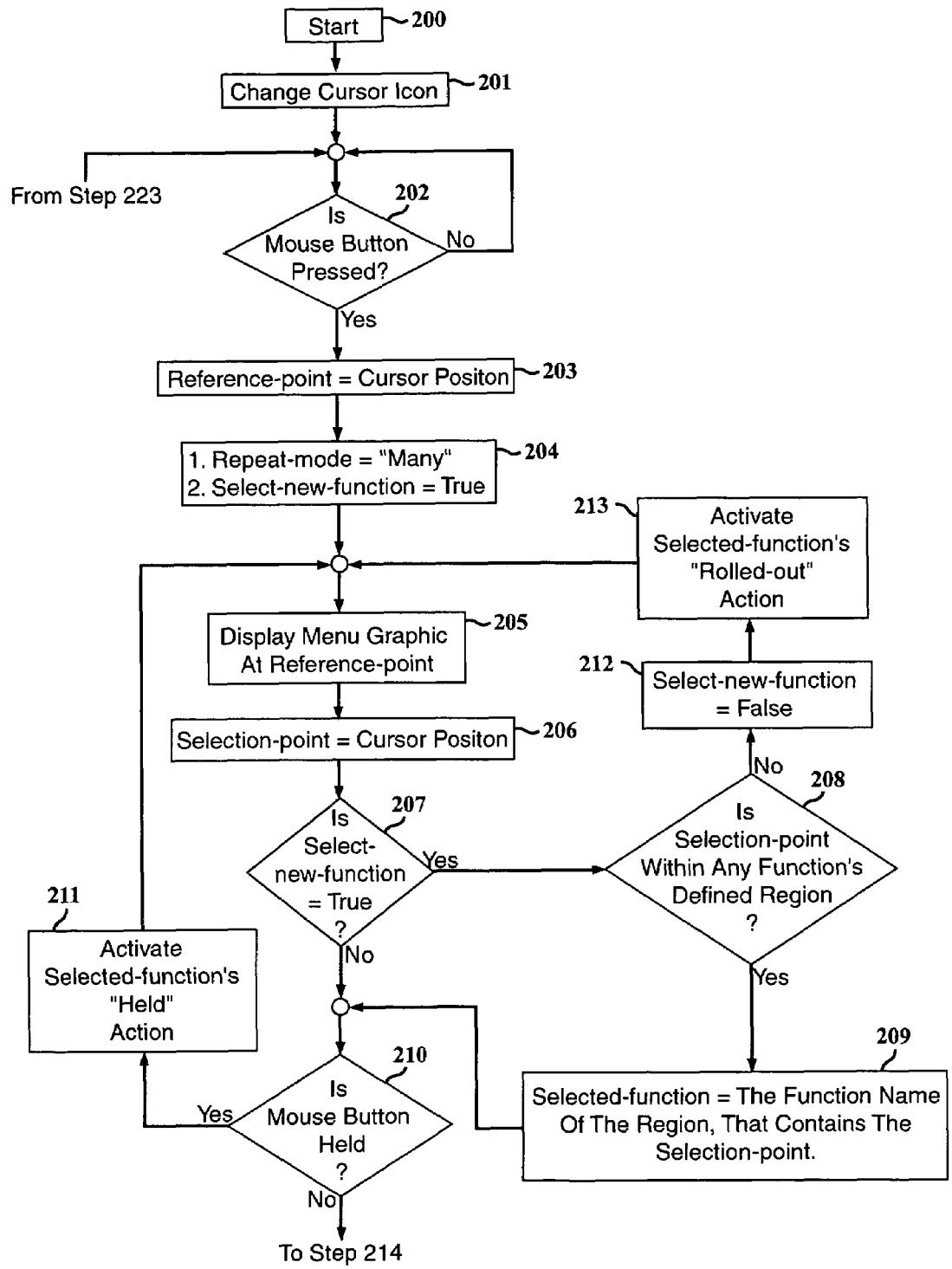
FIGS. 5A and 5B show a flowchart of a typical combination tool's operation.
Figure 11:
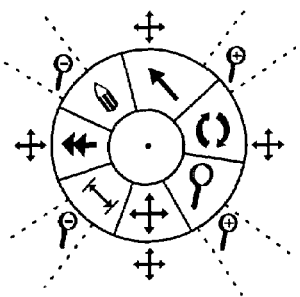
FIG. 11 depicts a typical region graphic of a combination zoom and pan tool.

The flowchart shown in FIG. 5A describes the operation of a typical combination tool. The combination tool is started 200 by the user clicking on a graphical object, such as a tool bar icon or pull-down menu or pop-up menu, pressing a key on keyboard, or clicking alternate mouse buttons, etc. In Step 201, the cursor's 14 icon may change to a graphic that depicts the characteristics of the particular combination tool, such as a pencil or a magnifying glass. The user may move the cursor 14 to an arbitrary location of interest in the display window 20, via the input device 13, such as a mouse or touch-screen. In step 202, the combination tool waits for the user to press-and-hold the mouse button or touch-and-hold a location of interest on a touch-screen with a stylus. Step 203 defines the reference-point 30 as the location of the touch or the cursor 14 at the instant of the button press. In step 204, a repeat-mode flag may be set to "Many" if the particular combination tool should start again after the mouse button is released or the stylus is removed. In addition, a select-new-function flag is set to "True" so that a new function will be selected and activated in subsequent steps. In step 205, a graphic located at the reference-point 30 may appear on top of the other graphics in the display window 20. The mentioned graphic, that depicts some or all of the combination tool's defined regions, may be translucent if the user is to see graphical objects 21, 22 beneath. In order to avoid distraction, an advanced user may utilize a setting that prevents the mentioned graphic from appearing immediately; the graphic will appear if the user presses-and-holds without dragging for a short duration, such as one second. The mentioned graphic may resemble a wagon wheel with icons that represent the functions arranged in the center hole and between the spokes as shown in FIG. 11. As the user drags the input device 13, step 206 defines the selection-point 31 as the current position of the cursor 14 or stylus. In step 207, if the select-new-function flag equals "True" (presently does) then the flow branches to step 208; otherwise, the flow branches to step 210. Step 208 compares the co-ordinates of the selection-point 31 against all of the predetermined combination tool's regions defined relative to the reference-point 30, and combination tool's regions that are defined relative to the display window's 20 origin 55 and boundaries 56, 57. If the selection-point 31 is contained within any of the regions (presently is), then the flow branches to step 209; otherwise, the flow branches to step 212. The selection-point 31 is described as "having rolled-off of a region" if moved from one region to a contiguous region. Step 209 defines the "selected-function" to be the function name associated with the region that contains the selection-point 31. At this time, the particular function is described as being "Selected". Step 210 checks the status of the input device's 13 button or stylus pressure. If the button is still being "Held" or the stylus is still touching the screen (presently is), then the flow branches to step 211; otherwise, the flow branches to step 214. Step 211 activates the selected-function's "Held" action, such as drawing a rectangle or panning the graphics in the display window 20. After the "Held" action is completed, the flow jumps back to step 205 to display the graphic depicting the possible regions at the reference-point 30.

While the selection-point 31 stays within the selected function's region, the associated "Held" action is repeated; thereby, allowing the user to perform such operations as shape a rectangle to encompass graphical objects 21, 22 of interest to later magnify, or pan the displayed graphical objects 21, 22 from the reference-point 30 to the selection-point 31. In the mentioned "Held" case, the steps that loop through are 205, 206, 207, 208, 209, 210, and 211.

In Step 208, referring back to FIG. 3, if the selection-point 31 moves out of a function's region 38 and does not enter a contiguous region associated with a new function, then the flow branches to step 212. As mentioned hereinabove, the user moving a selection-point 31 out of a function's region 38 while not entering a contiguous region associated with a new function is defined as "Rolled-out" 45. Alternatively, the user moving a selection-point 31 out of a function's region 37 while entering a contiguous region 38 associated with a new function is defined as "Rolled-off" 43. Step 212 sets the select-new-function flag to "False"; therefore, in subsequent steps, a new function will not be selected and activate by the user moving the selection-point 31 into the new function's associated regions. Next, step 213 completes the selected-function's "Rolled-out" action then jumps back to step 205.

A typical "Rolled-out" action may set the selected-function to none, and then start and complete an entire procedure which includes multiple clicks and drags, such as drawing a rectangle and then picking and dragging it to select and move a graphical object inside. Another "Rolled-out" action may do nothing or set the selected-function to a new function name such as dynamic-pan, or dynamic-rotate; resulting in, the user utilizing the entire display window 20 for the selected-function's "Held", and "Released", etc., actions. In summary, the user may touch and drag a stylus to "Roll-out" of a functions region; the flow then loops through steps 205, 206, 207, 210, and 211, as the user continues to drag the stylus to any location on the screen 11, during which time, the graphical objects 21, 22 may re-display (such as pan, zoom, rotate) and/or be altered by the selected-function's "Held" action.

Another typical "Rolled-out" action may activate a new combination tool that uses the existing reference-point 30. In an example combination tool comprising Select, Line, Rectangle, Circle, Zoom, Pan, and Rotate functions; the user may drag and "Roll-out" of "Select" to cause another combination tool comprised of Box-select, Pick-Select, Move, Copy, Zoom, Pan, and Rotate, to appear and activate. The user may continue the drag into and "Roll-out" of the Box-select function, then continue the same drag to draw a rectangle around graphical objects 21, 22 in the display window 20, and then remove the stylus contact with the screen 11 to complete the selection.

Figure 5B:
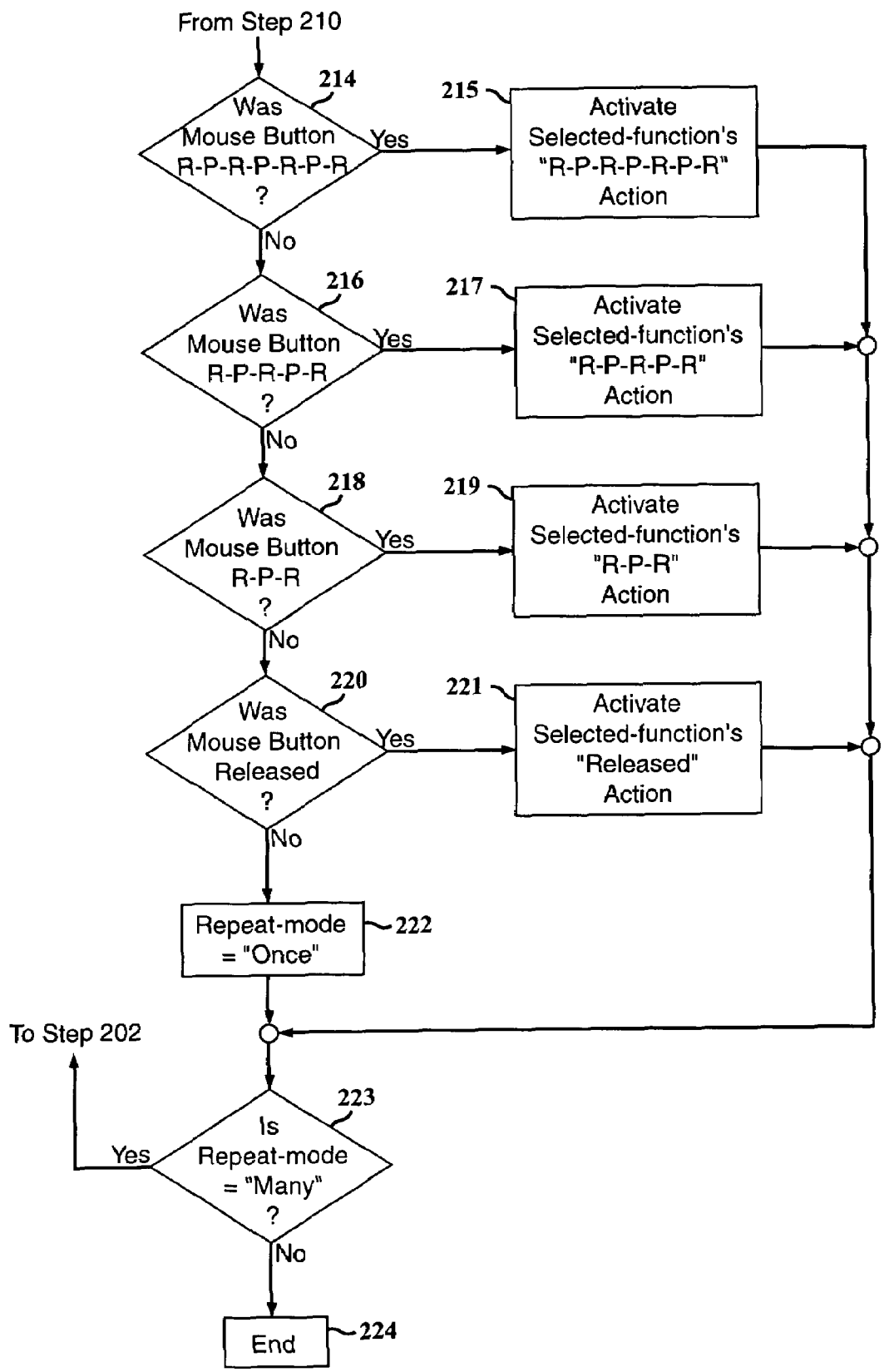

In step 210, if the input device's 13 button is no longer "Held" or the stylus is no longer touching the screen 11, then the flow branches to step 214 as depicted in FIG. 5B. In step 214, if the button or stylus was released-pressed-released-pressed-released-pressed-released in quick succession, then the flow branches to step 215; otherwise, the flow branches to 216. Step 215 activates and completes the selected-function's "R-P-R-P-R-P-R" action, such as change the repeat-mode to "Once", then jumps to step 223. In step 216, if the button or stylus was released-pressed-released-pressed-released in quick succession, then the flow branches to step 217; otherwise, the flow branches to 218. Step 217 activates and completes the selected-function's "R-P-R-P-R" action, such as undo the last operation, then jumps to step 223. In step 218, if the button or stylus was released-pressedreleased in quick succession, then the flow branches to step 219; otherwise, the flow branches to 220. Step 219 activates and completes the selected-function's "R-P-R" action, such as zoom out the display window 20 as far as possible, then jumps to step 223. In step 220, if the button or stylus was released, then the flow branches to step 221; otherwise, the flow branches to 222. Step 221 activates and completes the selected-function's "Released" action, such as permanently pan the display window 20, then jumps to step 223. Step 222 is only reached if the button was released more than 4 times then sets the repeat-mode to "Once" to exit the combination tool. In step 223, if the repeat-mode equals "Many" then the flow branches and jumps back to step 202 to repeat the combination tool; otherwise, the flow branches to step 224 where the combination tool ends.

A typical function may perform actions, such as (but not limited to) remove or show a graphic representing all or part of the possible distance ranges and angular bearing ranges or other regions over top of other graphics on the display screen; change the cursor icon to one that indicates the selected function's characteristics; change a graphic for one region to one that depicts selected, activated, rolled off, rolled out, etc; do nothing; activate a new combination tool with the same said reference-point 30; select and activate the previous or next combination tool in a list; cancel the combination tool and pass control to a thread that started it; change the repeat-mode flag; change the select-new-function flag; draw text, lines, circles, rectangles, or other geometric shapes or images; effect the displayed graphics in a particular way and may utilize the reference-point's 30 and/or selection-point's 31 co-ordinates to do so;

Prior art of U.S. Pat. No. 6,052,110, describes a zoom function with two regions; the first region zooms in at a velocity and the second region performs the negative of zoom in at a velocity, that is, zoom out at a velocity. A standard dynamic pan function may have one region with a pan function or four regions with substantially the same pan function in each. The present invention utilizes two or more substantially different functions that have regions defined relative to the reference-point 30 of a drag operation. That is, two or more functions behave substantially different from each other, such as pan the display and zoom in with a rectangle. In addition, "zoom in with a rectangle" is considered substantially different from a "dynamic zoom in" that is proportional to the length of the drag. The result for both functions is zooming in; however, each function's behavior is substantially different.

In the preferred embodiment of the present invention, the combination tool described hereinbelow has characteristics that create a very powerful yet simple to use zoom combination function, namely rectangle-zoom-in/out-and-point-zoom-out.

Figure 6:
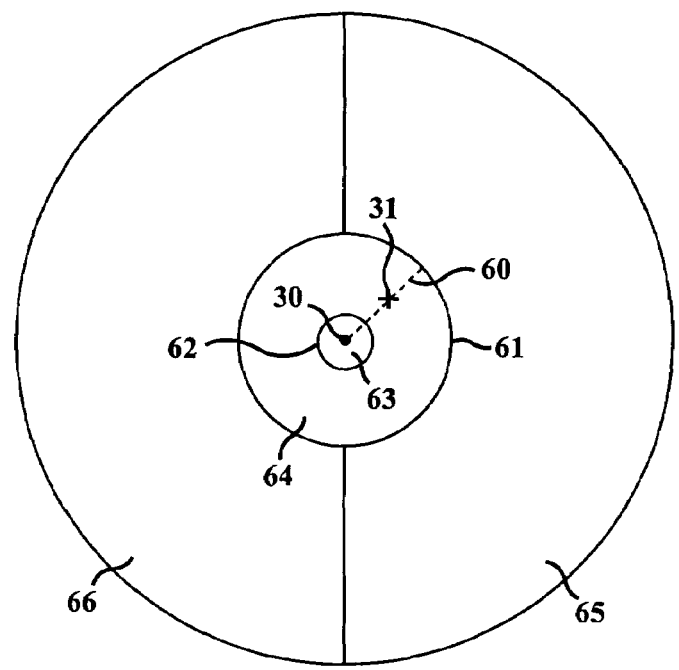
FIG. 6 shows the regions of a "rectangle-zoom-in/out-and-point-zoom-out" combination tool.

Referring to FIG. 6, the combination tool is comprised of four functions and three separate groups.

The first group, namely Grp1, is selected when the distance 32 between the reference-point 30 and the selection-point 31 is within a predetermined range, such as 0 to 5 pixels. The Grp1 group contains only a function named Zoom-out-point which is selected and activated when the angular bearing 33 between the reference-point 30 and the selection-point 31 is within a predetermined range, such as 0 to 360 degrees. The resulting first region 63 is a circle as shown in FIG. 6.

The second group, namely Grp2, is selected when the distance 32 between the reference-point 30 and the selection-point 31 is within another predetermined range, such as 6 to 20 pixels. The Grp2 group contains only a function named Zoom-out-variable which is selected and activates when the angular bearing 33 between the reference-point 30 and the selection-point 31 is within a predetermined range, such as 0 to 360 degrees. The resulting second region 64 is a ring as shown in FIG. 6.

Figure 7:
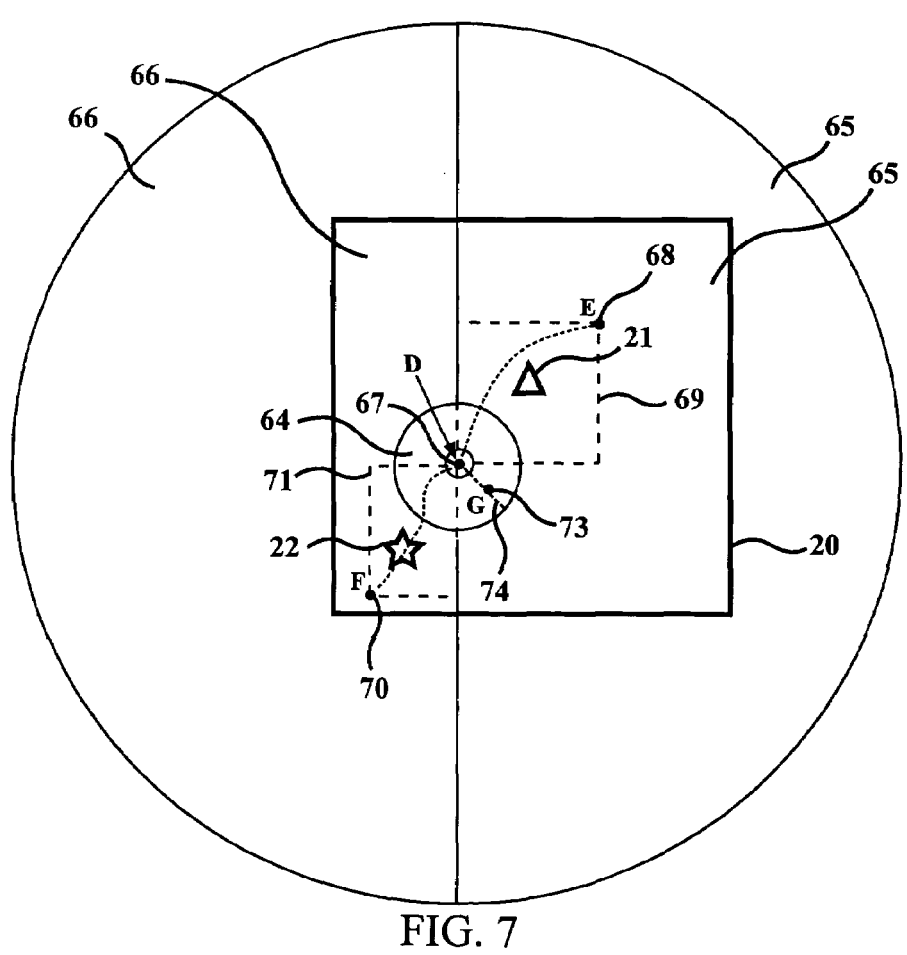
FIG. 7 shows an example of a "rectangle-zoom-in/out-and-point-zoom-out" combination tool in use.

The third group, namely Grp3, is selected when the distance 32 between the reference-point 30 and the selection-point 31 is within another predetermined range, such as 21 to 5000 pixels. Notice that the maximum value for the Grp3 range is larger than the diagonal of the display window 20. The Grp3 group contains two functions, Zoom-in-rectangle and Zoom-out-rectangle. The function Zoom-in-rectangle is selected and activates when the angular bearing 33 between the reference-point 30 and the selection-point 31 is within a predetermined range, such as 0 to 179 degrees. The resulting third region 65 is a portion of a ring with areas inside and outside of the display window 20, and is shown in FIGS. 6 and 7. The function Zoom-out-rectangle is selected and activates when the angular bearing 33 between the reference-point 30 and the selection-point 31 is within a predetermined range, such as 180 to 359 degrees. The resulting third region 66 is a portion of a ring with areas inside and outside of the display window 20, and is shown in FIGS. 6 and 7.

This particular combination tool fills the entire display; therefore, it is not possible to "roll-out" (vs. roll-off) of a function's region. The repeat mode is set to "many" unless overridden. No graphic depicting possible selection ranges appears overtop of the other graphics in the display window 20.

The function, named Zoom-out-point, does nothing when the mouse button is held. The function Zoom-out-point zooms the display window 20 out by a predetermined amount, such as thirty percent, when the mouse button is released. The function Zoom-out-point zooms the display window 20 out to show the entire graphical universe when the mouse button is released-pressed-released. The function Zoom-out-point undoes a previous display window 20 update, such as zoom or pan, when the mouse button was released-pressed-released-pressed-released. The function Zoom-out-point overrides the current combination tool's repeat mode to once when the mouse button was released-pressed-released-pressed-released-pressed-released thereby exiting the current combination tool.

The function, named Zoom-out-variable, displays a dashed line 60, from the reference-point 30 through the selection-point 31 and terminating on the region's outer border 61, while the mouse button is being held. Upon the mouse button being released, the function Zoom-variable zooms the display window 20 out by an amount that is proportional to the distance between the reference-point 30 and the selection-point 31. That is, the entire graphical universe is shown when the selection point 31 is coincident with the outer border 61, and the display window 20 zoom level is not changed when the selection-point 31 is coincident with the inner border 62. The function Zoom-out-variable does nothing when the mouse button is released-pressed-released. The function Zoom-out-variable overrides the combination tool's repeat mode to once when the mouse button is released-pressed-released-pressed-released, thereby, exiting the current combination tool.

The function, named Zoom-in-rectangle, displays a dashed-line rectangle on the display window 20, with one corner located at the reference-point 30 and the opposite corner located at the selection-point 31, when the mouse button is held. The function Zoom-in-rectangle also changes the cursor 14 graphic to one that depicts a plus sign within a magnifying glass when the mouse button is held. The function Zoom-in-rectangle zooms the display in by magnifying the graphics contained within the rectangle to fill the entire display window 20 when the mouse button is released. The function Zoom-in-rectangle does nothing when the mouse button is released-pressed-released. The function Zoom-in-rectangle overrides the combination tool's repeat mode to "once" when the mouse button is released-pressed-released-pressed-released, thereby, exiting the current combination tool.

The function, named Zoom-out-rectangle, displays a dashed rectangle on the display window 20, with one corner located at the reference-point 30 and the opposite corner located at the selection-point 31, when the mouse button is held. The function Zoom-out-rectangle also changes the cursor 14 graphic to one that depicts a minus sign within a magnifying glass when the mouse button is held. When the mouse button is released, the function Zoom-out-rectangle zooms the display window 20 out by shrinking all graphics shown within the display window 20 to fit inside the location of the rectangle and graphics previously not shown filling in the rest of the display window 20. The function Zoom-out-rectangle does nothing when the mouse button is released-pressed-released. The function Zoom-out-rectangle overrides the combination tool's repeat mode to once when the mouse button is released-pressed-released-pressed-released, thereby, exiting the current combination tool.

Figure 8:
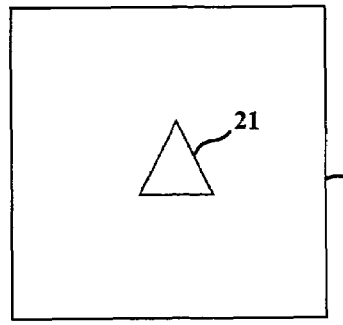
FIG. 8 shows a display window displaying a magnified triangle.
Figure 9:
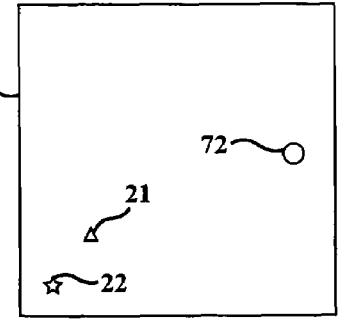
FIG. 9 shows a display window displaying a zoomed out view of a triangle, star and circle.

FIG. 7 shows an example of a "rectangle-zoom-in/out-and-point-zoom-out" combination tool in use. The user presses-and-holds the mouse button at location D 67, then drags the cursor 14 to location E 68 so that a rectangle 69 encompasses the (triangle) graphical object 21 of interest. The cursor 14 graphic changes to a plus sign within a magnifying glass while in the rectangle-zoom-in function's region 65. Upon release of the mouse button at location E 68, the display window 20 updates to display the magnified (triangle) graphical object 21 as shown in FIG. 8. Alternatively, the user may drag the cursor 14 to location F 70 so that the rectangle 71 defines an area of the window 20. The cursor 14 graphic changes to a minus sign within a magnifying glass while in the rectangle-zoom-out function's region 66. Upon release of the mouse button at location F 70, the display window 20 updates with shrunken (star and triangle) graphical objects 21, 22 in the defined area, as shown in FIG. 9. In addition, a new (circle) graphical object 72 previously not shown is now visible. Alternatively, if the user released the mouse button while still at location D 67, then the display window 20 zooms out by thirty percent; or zooms out as much as possible to display the entire graphical universe, if the button was released-pressed-released at location D 67. Alternatively, the user may drag the cursor 14 part of the way along the dashed line 74 to location G 73 in the zoom-out-variable function's region 64. Upon release of the mouse button at location G 73, the display window 20 zooms out by an amount such that a portion of the graphical universe is displayed.

In contrast to the conventional technique of clicking an icon or pop-up menu to activate a new function, once activated, the combination tool "rectangle-zoom-in/out-and-point-zoom-out" allows a user to zoom in or zoom out by a number of substantially different methods by only pressing, dragging, and releasing, an input device 13. The user may continue zooming until a new command activates by the user clicking on a tool-bar or pull-down menu.

In a second preferred embodiment of the present invention, the combination tool described hereinbelow has characteristics that create a very powerful zoom and pan combination function, namely rectangle-zoom-in/out-and-point-zoom-out-and-dynamic-pan. In addition, the user may also activate a new combination tool or function.

Figure 10:
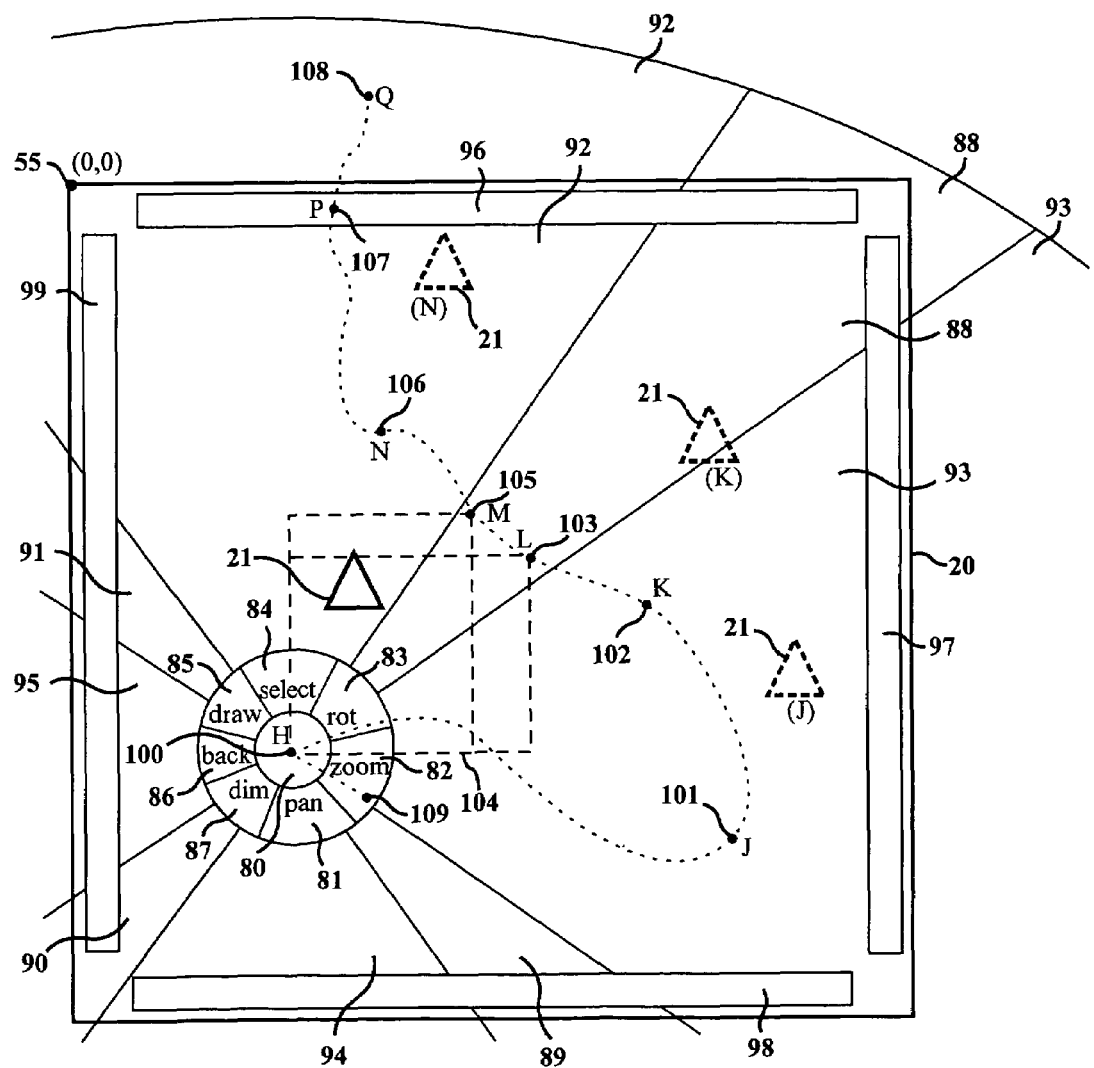
FIG. 10 depicts a combination zoom and pan tool.

Referring to FIG. 10, the combination tool is comprised of ten functions and three separate groups, along with an additional function in four regions 96, 97, 98, 99 defined relative to the borders of the display window.

The first group, namely Grp1, is selected when the distance 32 between the reference-point 30 and the selection-point 31 is within a predetermined range, such as 0 to 5 pixels. The Grp1 group contains only the function Zoom-out-point which is selected and activated when the angular bearing 33 between the reference-point and the selection-point is within a predetermined range, such as 0 to 360 degrees. The resulting first region 80 is a circle as shown in FIG. 10.

The second group, namely Grp2, is selected when the distance 32 between the reference-point 30 and the selection-point 31 is within another predetermined range, such as 6 to 20 pixels. The Grp2 group contains seven functions, pan-combination-tool-button, zoom-combination-tool-button, rotate-combination-tool-button, select-combination-tool-button, draw-combination-tool-button, back-button, and dimension-combination-tool-button. The functions are evenly spaced and are selected and activate when the angular bearings 33 between the reference-point 30 and the selection-point 31 are within predetermined ranges for each. The resulting regions 81, 82, 83, 84, 85, 86, 87 are segments of a ring as shown in FIG. 10.

The third group, namely Grp3, is selected when the distance 32 between the reference-point 30 and the selection-point 31 is within another predetermined range, such as 21 to 5000 pixels. Notice that the maximum value for the Grp3 range is larger than the diagonal of the display window 20. The Grp3 group contains three functions, Zoom-in-rectangle, Zoom-out-rectangle, and Dynamic-pan. The function Zoom-in-rectangle is selected and activates when the angular bearing 33 between the reference-point 30 and the selection-point 31 is within predetermined ranges, such as 35 to 55, and 125 to 145 degrees. The resulting regions 88, 89 are segments of a ring with areas inside and outside of the display window 20. The function Zoom-out-rectangle is selected and activates when the angular bearing 33 between the reference-point 30 and the selection-point 31 is within predetermined ranges, such as 215 to 235, and 305 to 325 degrees. The resulting regions 90, 91 are segments of a ring with areas inside and outside of the display window 20. The function Dynamic-pan is selected and activates when the angular bearing 33 between the reference-point 30 and the selection-point 31 is within predetermined ranges, such as 326 through 359 to 34, 56 to 124, 146 to 214, and 236 to 304 degrees. The resulting regions 92, 93, 94, 95 are segments of a ring with areas inside and outside of the display window 20.

In addition to the regions that are defined relative to the reference-point 30, four more regions 96, 97, 98, 99 are defined relative to the display window's 20 origin 55 and boundaries. These fixed regions 96, 97, 98, 99 are narrow, such as ten pixels, rectangles that are the approximate length of, and substantially close to, each of the four boundaries of the display window 20, as shown in FIG. 10. Each of the regions 96, 97, 98, 99 selects and activates the Pan-max-left/right/up/down function when the selection-point 31 is contained within.

The functions' "rolled-out" actions are not possible to activate in this particular combination tool because the Grp3 range is larger than the display. That is, it is not possible to "roll-out" (vs. roll-off) of any regions. The repeat mode is set to "many" unless overridden. A graphic, as shown in FIG. 11, depicting some of the possible regions 80, 81, 82, 83, 84, 85, 86, 87 and portions of the other regions 88, 89, 90, 91, 92, 93, 94, 95 may appear overtop of the other graphics in the display. To avoid distractions, a frequent user may change a combination tool setting that prevents the immediate displaying of the mentioned graphic, while changes to the cursor's 14 icon will communicate the defined regions and functions to the user. Alternatively, the user may keep the cursor motionless just after pressing-and-holding to cause the mentioned graphic to appear as a reminder.

A function named Dynamic-pan, temporarily pans (previews) the graphics in the display window 20 from the reference-point 30 to the selection-point 31 when the mouse button is held. The function Dynamic-pan permanently pans the graphics in the display window 20 from the reference-point 30 to the selection-point 31, when the mouse button is released. The function Dynamic-pan permanently pans the graphics in the display window 20 from the reference-point 30 to the selection-point 31 plus the width (or height) of the window when the mouse button is released-pressed-released. The said function Dynamic-pan does nothing when the mouse button was released-pressed-released-pressed-released, thereby, not accepting the previewed pan. The said function Dynamic-pan overrides the current combination tool's repeat mode to once when the mouse button was released-pressed-released-pressed-released-pressed-released, thereby, exiting the current combination tool.

The function named Pan-max-left/right/up/down changes the cursor 14 icon to depict a double arrow, and temporarily pans the graphics in the display window 20 from the reference-point 30 to the selection-point 31 when the mouse button is held. When the mouse button is released, the function Pan-max-left/right/up/down pans the display window 20 left (right/up/down) at a predetermined velocity until the mouse button is pressed-released. The function Pan-max-left/right/up/down pans the display window 20 as far left (right/up/down) as possible when the mouse button is released-pressed-released A function named Pan-combination-tool-button changes the region's graphic to one that depicts the icon is pressed, and changes the cursor's 14 icon to a graphic that depicts panning, while the mouse button is held. The function Pan-combination-tool-button's "Rolled-out" action sets the combination tool's selected-function to "Dynamic-pan". The function Pan-combination-tool-button activates the combination tool "rectangle-zoom-in/out-and-point-zoom-out-and-dynamic-pan" when the mouse button is released.

The function named Zoom-combination-tool-button changes the region's graphic to one that depicts the icon is pressed, and changes the cursor's 14 icon to a graphic that depicts zooming, while the mouse button is held. The function Zoom-combination-tool-button's "Rolled-out" action sets the combination tool's selected-function to nothing, and activates the combination tool "rectangle-zoom-in/out-and-point-zoom-out-dynamic-pan-dominent-zoom".
The function Zoom-combination-tool-button activates the combination tool "rectangle-zoom-in/out-and-point-zoom-out-dynamic-pan-dominent-zoom" when the mouse button is released.

The function named rotate-combination-tool-button changes the region's graphic to one that depicts the icon is pressed, and changes the cursor's 14 icon to a graphic that depicts rotating, while the mouse button is held. The function rotate-combination-tool-button's "Rolled-out" action sets the combination tool's selected-function to "Dynamic-rotate-3d-view". The function rotate-combination-tool-button activates the combination tool "rectangle-zoom-in/out-and-point-zoom-out-and-dynamic-rotate-3d-view" when the mouse button is released.

The function named Select-combination-tool-button, changes the region's graphic to one that depicts the icon is pressed, and changes the cursor's 14 icon to a graphic that depicts selecting, while the mouse button is held. The function Select-combination-tool-button's "Rolled-out" action sets the combination tool's selected-function to nothing, and activates a combination tool that deals with selecting, moving, copying, and altering. The function Select-combination-tool-button activates a combination tool that deals with selecting, moving, copying, and altering, when the mouse button is released.

The function named Draw-combination-tool-button, changes the region's graphic to one that depicts the icon is pressed, and changes the cursor's 14 icon to one that depicts drawing, while the mouse button is held. The function Draw-combination-tool-button's "Rolled-out" action sets the combination tool's selected-function to nothing, and activates a combination tool that deals with drawing. The function Draw-combination-tool-button activates a combination tool that deals with drawing when the mouse button is released.

The function named Dimension-combination-tool-button, changes the region's graphic to one that depicts the icon is pressed, and changes the cursor's 14 icon to one that depicts Dimensioning, while the mouse button is held. The function Dimension-combination-tool-button's "Rolled-out" action sets the combination tool's selected-function to nothing, and activates a combination tool that deals with dimensioning. The function Dimension-combination-tool-button activates a combination tool that deals with dimensioning when the mouse button is released.

The function named Back-combination-tool-button, changes the region's graphic to one that depicts the icon is pressed, and changes the cursor's 14 icon to one that depicts go-back, while the mouse button is held. The function Back-combination-tool-button's "Rolled-out" action sets the combination tool's repeat-mode to "Once", thereby, ending the current combination tool so that a previous combination tool will be active. Upon releasing the mouse button, the function Back-combination-tool-button sets the combination tool's repeat-mode to "Once", thereby, ending the current combination tool so that a previous combination tool will be active.

Figure 12:
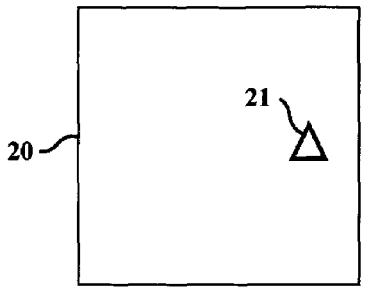
FIG. 12 shows a display window displaying a triangle that was panned to the right.

Further, FIG. 10 shows an example of a "rectangle-zoom-in/out-and-point-zoom-out-and-dynamic-pan" combination tool in use. The user presses-and-holds the mouse button at location H 100, then drags the cursor 14 to location J 101. Along the way, the selection-point 31 rolled-off two regions 80,83 and entered a region 93 that is associated with a Dynamic-pan function. While the selection-point 31 is within the Dynamic-pan region 93, the graphics in the display window 20 pan temporarily from the reference-point 30 to the selection-point 31. If the mouse button was released at location J 101, the graphics in the display window 20 pan permanently as shown in FIG. 12. Alternatively, the user may instead continue the drag to location K 102 and then to location L 103 in the zoom-in-rectangle region 88. Upon entering the zoom-in-rectangle region 88, the temporary pan is undone to show the (triangle) graphical objects 21 in their initial positions. The cursor 14 graphic changes to a plus sign within a magnifying glass while in the region 88. In addition, a dashed-line rectangle 104 between the reference-point 30 and the selection-point 31 appears.

The user may then continue the drag to location M 105 to cause the rectangle 104 to encompass the (triangle) graphical object 21 of interest. Upon release of the mouse button at location M 105, the display window 20 updates to display a magnified (triangle) graphical object 21, as shown in FIG. 8. Alternatively, the user may continue the drag to location N 106 in the Dynamic-pan region 92 and then to location P 107. Upon release of the mouse button at location P 107, in the Pan-max-left/right/up/down region 96, the display window 20 pans upward at a predetermined velocity and stops when the mouse is pressed-and-released. If the mouse button was released-pressed-released at location P 107, then the display window 20 pans as far upward as possible. Alternatively, the user may instead continue the drag out of the display window 20 to location Q 108 resulting in the temporary panning, from the reference-point 30 to the virtual selection-point 31, to continue until the mouse button is released.

In contrast to the conventional technique of clicking an icon to activate a new function, once activated, the combination tool "rectangle-zoom-in/out-and-point-zoom-out-dynamic-pan" allows a user to zoom in, or zoom out by two methods, as well as pan the display window by a number of methods, by only pressing-dragging-and-releasing an input device 13. The user may continue zooming and panning until a new function activates by the user releasing a drag with the selection-point 31 at a location 109 on a combination-tool button in the inner ring, or by clicking a pull-down menu or tool bar.

If the primary purpose of the mentioned combination tool is to zoom instead of pan, namely "rectangle-zoom-in/out-and-point-zoom-out-dynamic-pan-dominent-zoom", then regions 92, 93, 94, 95 associated with Dynamic-pan may be reduced, such as spanning twenty degrees, and the zoom-in/out-rectangle regions 88, 89, 90, 91 may be enlarged, such as spanning seventy degrees.

Similarly, a unique combination tool is created when one or more of the selection/activation regions 88, 89, 90, 91, 92, 93, 94, 95 defined for functions, zoom-out-point, dynamic-pan, zoom-in-rectangle, or zoom-out-rectangle, alternatively selects and activates one or more of dynamic-zoom-center, dynamic-zoom-ref-point, zoom-in-rectangle, zoom-out-rectangle, dynamic-pan, dynamic-rotate-3d-view, functions as defined herein, as well as other useful functions not explicitly defined such as, dynamic-2d-rotate, dynamic-rotate-3d-object, section-cut-position-adjust, time-scale-move, animation-frame-forward-rev, move, copy, etc.

The mentioned Grp2 range may be split into any number of regions that activate other functions, commands, settings, or combination tools, etc. As well, groups may be added to provide more rings for additional regions. Alternatively, the Grp2 range and functions may be deleted to provide more space and less of a distraction for the user.

Another combination tool can be created by bisecting the angular ranges of some of the regions 92, 93, 94, 95. The new regions may be associated with dynamic-pan or dynamic-rotate-3d-view. The resulting combination tool, namely "rectangle-zoom-in/out-and-point-zoom-out-dynamic-pan-dynamic-rotate-3d-view", is a zoom and pan and rotate combination tool.

In a third preferred embodiment of the present invention, the combination tool described hereinbelow, namely roll-out-draw-zoom-pan-rotate, has characteristics that allows a user to press-and-drag and "Roll-out" of a function's region, then continue the same drag backward or elsewhere while the activated function effects the displayed information in a particular way.

A typical function may zoom, pan, rotate, draw shapes, fill areas, choose a color, dimension, select objects, move, copy, alter attributes, activate a procedure, or activate another combination tool, etc.

Figure 13A:
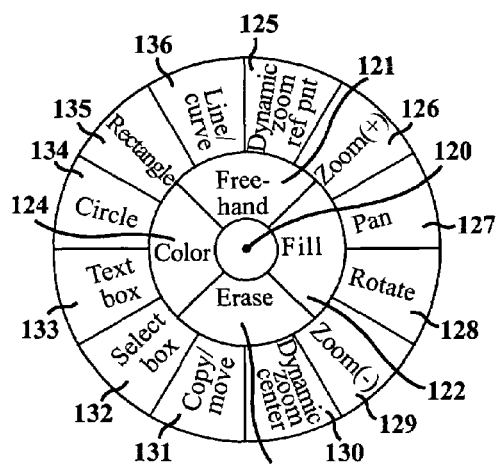
FIG. 13A shows an example of a roll-out zoom, pan, rotate, draw, copy, select, etc. combination tool.

Referring to FIG. 13A, the combination tool is comprised of seventeen functions and three separate groups within a diameter that is substantially smaller than the size of the display window 20, such as sixty pixels.

The first group, namely Grp1, is selected when the distance 32 between the reference-point 30 and the selection-point 31 is within a predetermined range, such as 0 to 5 pixels. The Grp1 group contains only the function advance/undo/back-combination-tool-button, which is selected and activates when the angular bearing 33 between the reference-point 30 and the selection-point 31 is within a predetermined range, such as 0 to 360 degrees. The resulting first region 120 is a circle, as shown in FIG. 13A.

The second group, namely Grp2, is selected when the distance 32 between the reference-point 30 and the selection-point 31 is within another predetermined range, such as 6 to 20 pixels. The Grp2 group contains four functions, freehand-draw-combination-tool-button, fill-combination-tool-button, freehand-erase-combination-tool-button, and color-combination-tool-button. The function's are selected and activate when the angular bearing 33 between the reference-point 30 and the selection-point 31 is within predetermined ranges for each, such as 316 through 359 to 45 degrees, and 46 to 135, 136 to 225, 225 to 315, degrees respectively. The resulting regions 121, 122, 123, 124 are segments of a ring, as shown in FIG. 13.

The third group, namely Grp3, is selected when the distance 32 between the reference-point 30 and the selection-point 31 is within another predetermined range, such as 21 to 30 pixels. The Grp2 group contains twelve functions, dynamic-zoom-reference-point, rectangle-zoom-in, dynamic-pan, rotate-3d-view, rectangle-zoom-out, dynamic-zoom-center, move-copy-combination-tool-button, select-box-combination-tool-button, draw-text-box, draw-circle-arc, draw-rectangle, and draw-line-curve. The functions are selected and activate when the angular bearing 33 between the reference-point 30 and the selection-point 31 is within predetermined ranges for each, such as 0 to 29, 30 to 59, 60 to 90, 91 to 120, 121 to 150, 151 to 180, 181 to 210, 211 to 240, 241 to 270, 271 to 300, 301 to 330, and 331 to 360 degrees respectively. The resulting regions 125, 126, 127, 128, 129, 130, 131, 132, 133, 134, 135, 136 are segments of a ring, as shown in FIG. 13.

The function named advance/undo/back-combination-tool-button changes the region's graphic to one that depicts the icon is pressed, and changes the cursor's 14 icon to a graphic that depicts "advance to the next combination-tool and undo and back", while the mouse button is held. The function advance/undo/back-combination-tool-button activates the next combination tool in a list when the mouse button is released. The function advance/undo/back-combination-tool-button undoes the last completed command such as, draw, zoom, copy, etc. when the mouse button is released-pressed-released. The function advance/undo/back-combination-tool-button sets the combination tool's repeat-mode to "once" when the mouse button is released-pressed-released-pressed-released, thereby, exiting the current combination tool and continuing with a previous combination tool if applicable.

The function named freehand-draw-combination-tool-button changes the region's graphic to one that depicts the icon is pressed, and changes the cursor's 14 icon to one that depicts a "pencil and brush and spray", while the mouse button is being held. The function freehand-draw-combination-tool-button activates a point draw procedure when the mouse button is released. The function freehand-draw-combination-tool-button activates a paintbrush draw procedure when the mouse button is released-pressed-released. The function freehand-draw-combination-tool-button activates a spray-paint draw procedure when the mouse button is released-pressed-released-pressed-released. The mentioned draw procedures draw their shapes at the cursor 14 position during new press-drag-releases to form freehand curves, or mist patterns. The user may press-and-release-and-press-and-release (double-click) without dragging to end the procedure and return to the combination tool.

The function named freehand-erase-combination-tool-button changes the region's graphic to one that depicts the icon is pressed, and changes the cursor's 14 icon to one that depicts an eraser, while the mouse button is held. The function freehand-erase-combination-tool-button activates a small square erase procedure when the mouse button is released. The function freehand-erase-combination-tool-button activates a large square erase procedure when the mouse button is released-pressed-released. The mentioned erase procedure, erases graphics within their shapes at the cursor 14 position during new press-drag-releases to freehand erase pixels. The user may press-and-release-and-press-and-release (double-click) without dragging to end the procedure and return to the combination tool.

The function named fill-combination-tool-button changes the region's graphic to one that depicts the icon is pressed, and changes the cursor's 14 icon to one that depicts a paint-can, while the mouse button is held. The function fill-combination-tool-button fills an area, within the displayed graphical information, that contains the reference-point 30 when the mouse button is released.

The function named color-combination-tool-button changes the region's graphic to one that depicts the icon is pressed, and changes the cursor's 14 icon to one that depicts a rainbow, while the mouse button is held. The function color-combination-tool-button activates a standard "choose color" dialog box when the mouse button is released. After the dialog box is closed, the combination tool re-activates.

The function named Dynamic-zoom-center changes the cursor's 14 icon to one that depicts a magnifying glass beside an up-and-down arrow, and temporarily zooms the display window 20 in or out by an amount proportional to the y-co-ordinate of the reference-point 30 minus the y-co-ordinate of the selection-point 31, while the mouse button is held. The function dynamic-zoom-center permanently zooms the display window 20 in or out by an amount proportional to the y-co-ordinate of the reference-point 30 minus the y-co-ordinate of the selection-point 31, if the mouse button was released. The function dynamic-zoom-center does nothing if the mouse button was released-pressed-released, thereby, undoing the preview zoom. The function dynamic-zoom-center sets the combination tool's repeat-mode to "Once" if the mouse button was released-pressed-released-pressed-released, thereby, undoing the preview zoom and re-activating a previous combination tool, if applicable.

The function named Dynamic-zoom-reference-point changes the cursor's 14 icon to one that depicts a dot within a magnifying glass beside an up-and-down arrow, and temporarily zooms the display window 20 in or out by an amount proportional to the y-co-ordinate of the reference-point 30 minus the y-co-ordinate of the selection-point 31, while the mouse button is held. In addition to zooming, the graphics in the display window 20 dynamically pan such that the original pixel of data under the reference-point 30 progressively moves to the center of the display window 20 with each increase in zoom level. The function dynamic-zoom-reference-point permanently zooms and pans the display as mentioned above if the mouse button was released. The function dynamic-zoom-reference-point does nothing if the mouse button was released-pressed-released, thereby, undoing the preview zoom. The function dynamic-zoom-reference-point sets the combination tool's repeat-mode to "Once" if the mouse button was released-pressed-released-pressed-released, thereby, undoing the preview zoom and re-activating a previous combination tool, if applicable.

The function named draw-text-box displays a rectangle on the display window 20, with one corner located at the reference-point 30 and the opposite corner located at the selection-point 31, when the mouse button is held. The function draw-text-box also changes the cursor 14 graphic to one that depicts a capital T when the mouse button is held. The function draw-text-box waits for keyboard presses to fill the created rectangle if the mouse button was released. The function draw-text-box creates a rectangle then dynamically rotates the rectangle parallel to the angular bearing 33 of the original reference-point 30 to the new selection-point 31 if the mouse button was released-pressed-dragged, and ends the rotation and waits for keyboard presses to fill the rectangle when the mouse button is finally released. The function draw-text-box does nothing if the mouse button was released-pressed-released-pressed-released.

The function named draw-rectangle temporarily displays a rectangle on the display window 20, with one corner located at the reference-point 30 and the opposite corner located at the selection-point 31, when the mouse button is held. The function draw-rectangle also changes the cursor 14 graphic to one that depicts a rectangle when the mouse button is held. The function draw-rectangle permanently draws the rectangle if the mouse button was released. The function draw-rectangle dynamically rotates the created rectangle parallel to the angular bearing 33 of the original reference-point 30 to the new selection-point 31 if the mouse button was released-pressed-dragged, and ends the rotation, and permanently creates the rectangle when the mouse button is finally released. The function draw-rectangle does nothing if the mouse button was released-pressed-released-pressed-released.

The function named draw-circle-arc temporarily displays a circle on the display window 20, with the center located at the reference-point 30 and the radius located at the selection-point 31, when the mouse button is held. The function draw-circle-arc also changes the cursor 14 graphic to: one that depicts a circle and arc when the mouse button is held. The function draw-circle-arc permanently draws the circle if the mouse button was released. The function draw-circle-arc dynamically draws an arc with a center point at the original reference-point 30 and one end terminating at the location of the selection-point 31 at the time if the mouse button was released-pressed-dragged and the other end of the arc terminates at the virtual line between the original reference-point 30 and the current selection-point 31; the arc becomes permanent when the mouse button is finally released. The function draw-circle-arc does nothing if the mouse button was released-pressed-released-pressed-released.

The functions move-copy-combination-tool-button, and select-box-combination-tool-button, will change the region's graphic to one that depicts the icon is pressed, and change the cursor's 14 icon to a graphic that depicts the characteristics of the function, while the mouse button is being held. The mentioned functions will activate the appropriate combination tool when the selection-point 31 is "Rolled-out" of the function's region, thereby continuing with the drag to roll into then roll-out of a function on the new combination tool. The functions will activate the appropriate combination tool, if the mouse button was released, thereby, the next time the user presses-and-holds the mouse button the new combination tool appears.

The function draw-line-curve will temporarily draw a dashed line between the reference-point 30 and the selection-point 31 while the mouse button is held. The function draw-line-curve permanently draws a solid line between the reference-point 30 and the selection-point 31 if the mouse button was released. The function draw-line-curve permanently draws a solid straight curve between the reference-point 30 and the selection-point 31 then activates a warp-curve procedure if the mouse button was released-pressed-released. The function draw-line-curve permanently draws a dashed center-line between the reference-point 30 and the selection-point 31 if the mouse button was released-pressed-released-pressed-released. The procedure warp-curve allows the user to press-and-drag close to a straight curve to cause it to bend near the reference-point 30 by an amount that is proportional to the distance 32 between the reference-point 30 and selection-point 31. This press-drag-release action repeats twice before the procedure ends and returns the thread to the combination tool that activated it.

The function named Dynamic-rotate-3d-view temporarily rotates (previews) the viewpoint angle of the display window 20 proportional to the reference-point 30 to the selection-point 31, when the mouse button is held. The function Dynamic-rotate-3d-view permanently rotates the viewpoint angle of the display window 20 proportional to the reference-point 30 to the selection-point 31, if the mouse button was released. The function Dynamic-rotate-3d-view permanently snaps (rotates) the viewpoint to be parallel to the closest graphical universe positive or negative x/y/z axis, if the mouse button was released-pressed-released. The said function Dynamic-rotate-3d-view snaps the original viewpoint (not the previewed viewpoint) by ninety degrees in the direction of the closest display screen axis to line between the reference-point 30 to the selection-point 31 if the mouse button was released-pressed-released-pressed-released. The said function Dynamic-rotate-3d-view overrides the current combination tool's repeat mode to once if the mouse button was released-pressed-released-pressed-released-pressed-released, thereby, exiting the current combination tool.

Figure 13B:
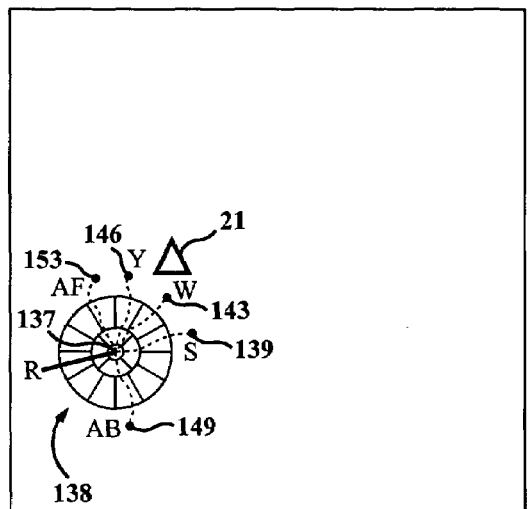
FIG. 13B shows the roll-out combination tool in use.
Figure 13C:
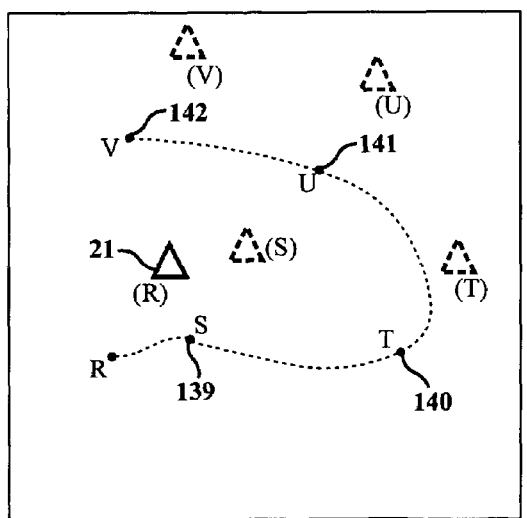
FIG. 13C shows the result of rolling-out of the pan function.

FIG. 13B shows an example of a "roll-out-draw-zoom-pan-rotate" combination tool in use. The user positions the cursor 14 and presses-and-holds the mouse button at location R 137; resulting in, the possible regions graphic 138 displaying, and then drags the cursor 14 to location S 139. Along the way, the selection-point 31 rolled-off of the "fill-combination-tool-button" region 122 and rolled-out of the region 127 that is associated with the Dynamic-pan function. The mentioned rolled-out action prevents the possible regions graphic from appearing, as shown in FIG. 13C. While the user continues to drag the selection-point 31 to any location such as T 140, U 141, or V 142, the graphics in the display window 20 pan temporarily from the reference-point 30 to the selection-point 31. Upon release of the mouse button at location T 140, the graphics in the display window 20 pan permanently, as shown in FIG. 12.

Figure 13D:
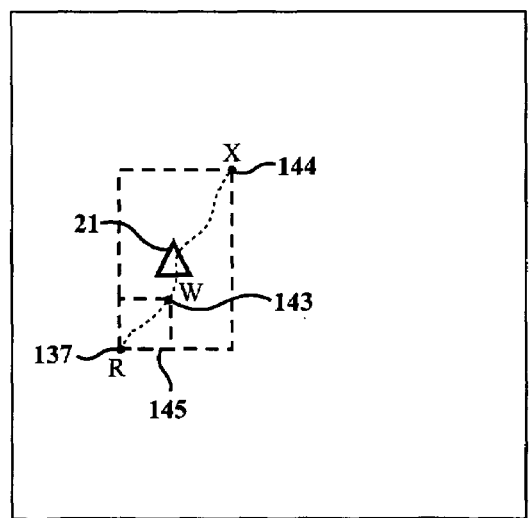
FIG. 13D shows the result of rolling-out of the zoom-in-rectangle function.

Alternatively, in FIG. 13B, the user and presses-and-holds the mouse button at location R 137 resulting in the possible regions graphic 138 appearing then drags the cursor 14 to location W 143. Along the way the selection-point 31 rolled-off of the "fill-combination-tool-button" region 122 and rolled-out of the region 126 that is associated with the rectangle-zoom-in function. The mentioned rolled-out action prevents the possible regions graphic from appearing as shown in FIG. 13D. A dashed-line rectangle 145 appears between the reference-point 30 and the selection-point 31 while the user continues to drag the selection-point 31 to encompass a (triangle) graphical object 21 of interest at location X 144. Upon release of the mouse button at location X 144, the display window 20 updates to display a magnified (triangle) graphical object 21 as shown in FIG. 8.

Figure 13E:
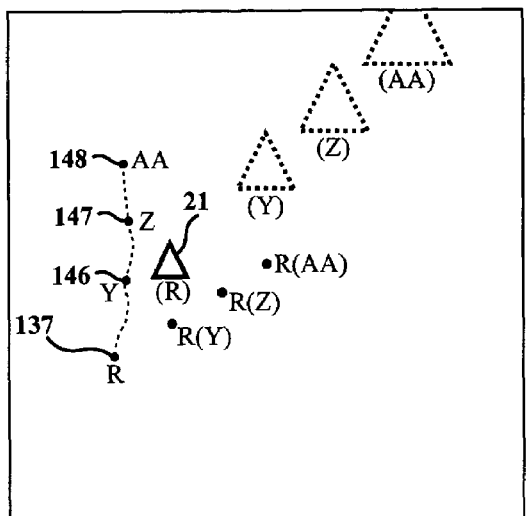
FIG. 13E shows the result of rolling-out of the dynamic-zoom-reference-point function.

Alternatively, in FIG. 13B, the user presses-and-holds the mouse button at location R 137, resulting in the possible regions graphic 138 appearing, then drags the cursor 14 to location Y 146. Along the way, the selection-point 31 rolled-off of the "freehand-combination-tool-button" region 121 and rolled-out of the region 125 that is associated with the dynamic-zoom-reference-point function. The mentioned rolled-out prevents the possible regions graphic from appearing as shown in FIG. 13E. The display window 20 zooms in while the user continues to drag the selection-point 31 to locations Y 146, Z 147, and AA 148. Notice that the pixel at the original point R 137 moves through locations R(Y), R(Z), R(AA), to the center of the display window 20 while the (triangle) graphical object 21 enlarges and maintains relationship to the moving location R. Therefore, if there were a star shape centered about location R 137, the star would slowly pan to the center of the display window 20 while enlarging as the user zooms in.

Figure 13F:
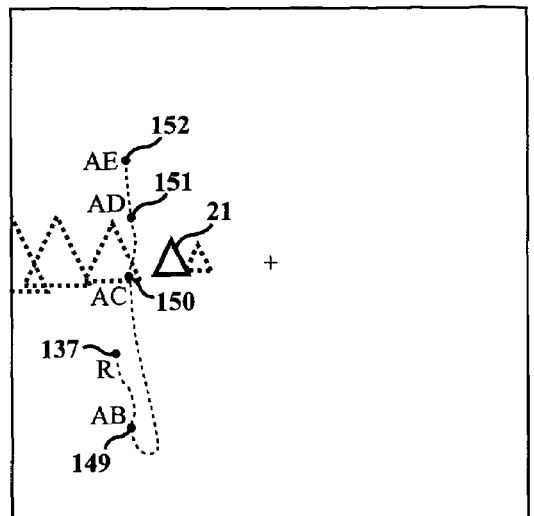
FIG. 13F shows the result of rolling-out of the dynamic-zoom-center function.

Alternatively, in FIG. 13B, the user and presses-and-holds the mouse button at location R 137, resulting in the possible regions graphic 138 displaying, then drags the cursor 14 to location AB 149. Along the way the selection-point 31 rolled-off of the "eraser-combination-tool-button" region 123 and rolled-out of the region 130 that is associated with the dynamic-zoom-center function. The mentioned rolled-out action prevents the possible regions graphic from appearing as shown in FIG. 13F. The display window 20 zooms out then in while the user continues to drag the selection-point 31 to locations AB 149, AC 150, AD 151, and AE 152. Notice that the original point R 137 moves out of the display window 20 while the (triangle) graphical object 21 enlarges and maintains relationship to the moving location R. Therefore, if there were a star shape in the center of the display window 20, the star would not move while enlarging or shrinking as the user zooms in or out. Notice the difference when compared to the panning behavior of Dynamic-zoom-reference-point.

Figure 13G:
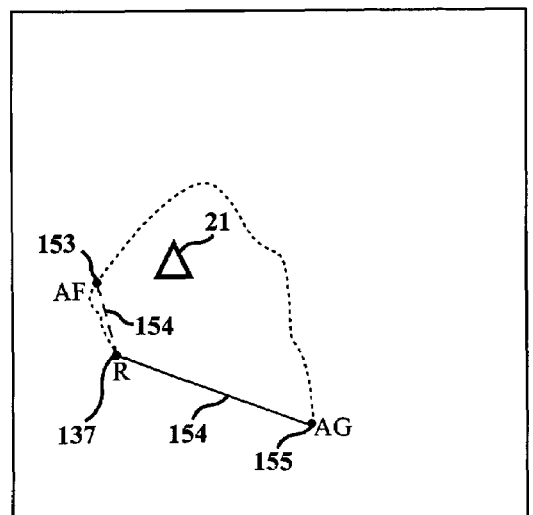
FIG. 13G shows the result of rolling-out of the draw line/curve function.
Figure 13H:
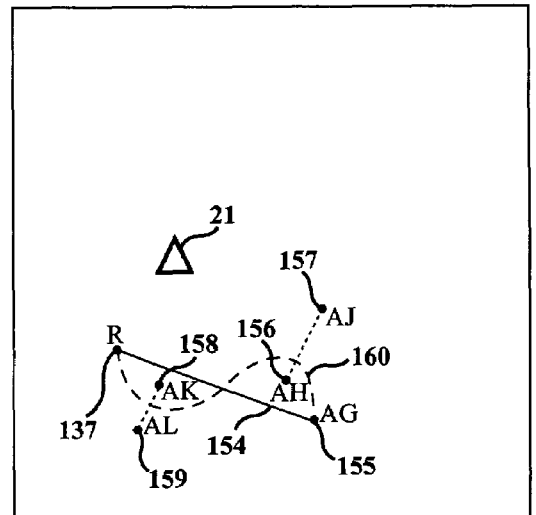
FIG. 13H shows the result of double releasing at the end of the draw line drag to activate a create a curve procedure.

Alternatively, in FIG. 13B, the user presses-and-holds the mouse button at location R 137 resulting in the possible-regions graphic 138 appearing, and then drags the cursor 14 to location AF 153. Along the way the selection-point 31 rolled-off of the "freehand-combination-tool-button" region 121 and rolled-out of the region 136 that is associated with the draw-line-curve function. In FIG. 13G, a line 154 between the reference-point 30 and the selection-point 31 appears on the display window 20 while the user continues to drag the selection-point 31 to locations AF 153 and AG 155. The solid line 154 becomes permanent if the user released the mouse button. Alternatively, if the user released-pressed-released-pressed-released the mouse button at location AG 155 then the line 154 becomes a permanent "dashed" line such as a centerline. Alternatively, if the user released-pressed-released the mouse button at location AG 155 then the warp-curve procedure activates, as shown in FIG. 13H. The user then drags twice by pressing at location AH 156 and releasing at location AJ 157 then pressing at location AK 158 and releasing at location AL 159 resulting in the line warping to become a curve 160. After the user drags twice, the warp-curve procedure ends and the thread returns to the combination tool.

In contrast to the conventional technique of clicking an icon to activate a new function, once activated, the combination tool "roll-out-draw-zoom-pan-rotate" allows a user to zoom in or out by four different methods, pan, rotate the view in 3d, draw shapes and text, select objects, and move or copy, by only pressing and dragging out of a region to activate a function, then releasing after the desired effect is achieved. The user may also undo the last command, jump to the next combination-tool, jump to the previous combination-tool, freehand draw and erase, as well as, choose a new color, or fill an area in the graphics, by pressing-dragging and releasing on top of one of the internal regions of the combination tool. The user may continue performing the mentioned actions until a new command/function activates, by the user clicking a pull-down menu or tool bar.

Further in the present invention, if during a drag, the selection-point 31 becomes motionless for a long duration (5 seconds) within any function's region, a pop-up menu of additional functions appears. The user then continues the drag and releases the mouse button within the pop-up menu on a desirable-new-function. The mentioned desirable-new-function then replaces the original function in that region; thereby, the next time the user presses the mouse button the combination tool now comprises the desirable-new-function. Alternately, if the user "rolled-out" of the pop-up menu's desirable-new-function, the desirable-new-function immediately activates with the current drag and does not replace the original function the next time the user presses-and-holds the mouse button.

In another preferred embodiment of the present invention, a combination-tool, namely "roll-out-navigate-existing", occupies approximately one quadrant and is used in conjunction with existing tools. The mentioned combination-tool toggles "always-on" or "off" by a menu pick or click of a tool-bar icon outside the edge of the window. The user may then activate regular existing tools, such as line, erase, copy, move, edit, text, dimension, as usual by pull-down menu or tool-bar icon, while the combination-tool is in the toggled on state. If the combination-tool comprises functions such as dynamic-pan, zoom-in-rectangle, dynamic-rotate-3d-view, and zoom-out-point, then the user may release within or "roll-out of" to activate these navigation functions while working with a specific tool that was previously activated, such as draw text, lines, move, copy, rotate objects, select, stretch, pan, drag and drop, etc.

Figure 14:
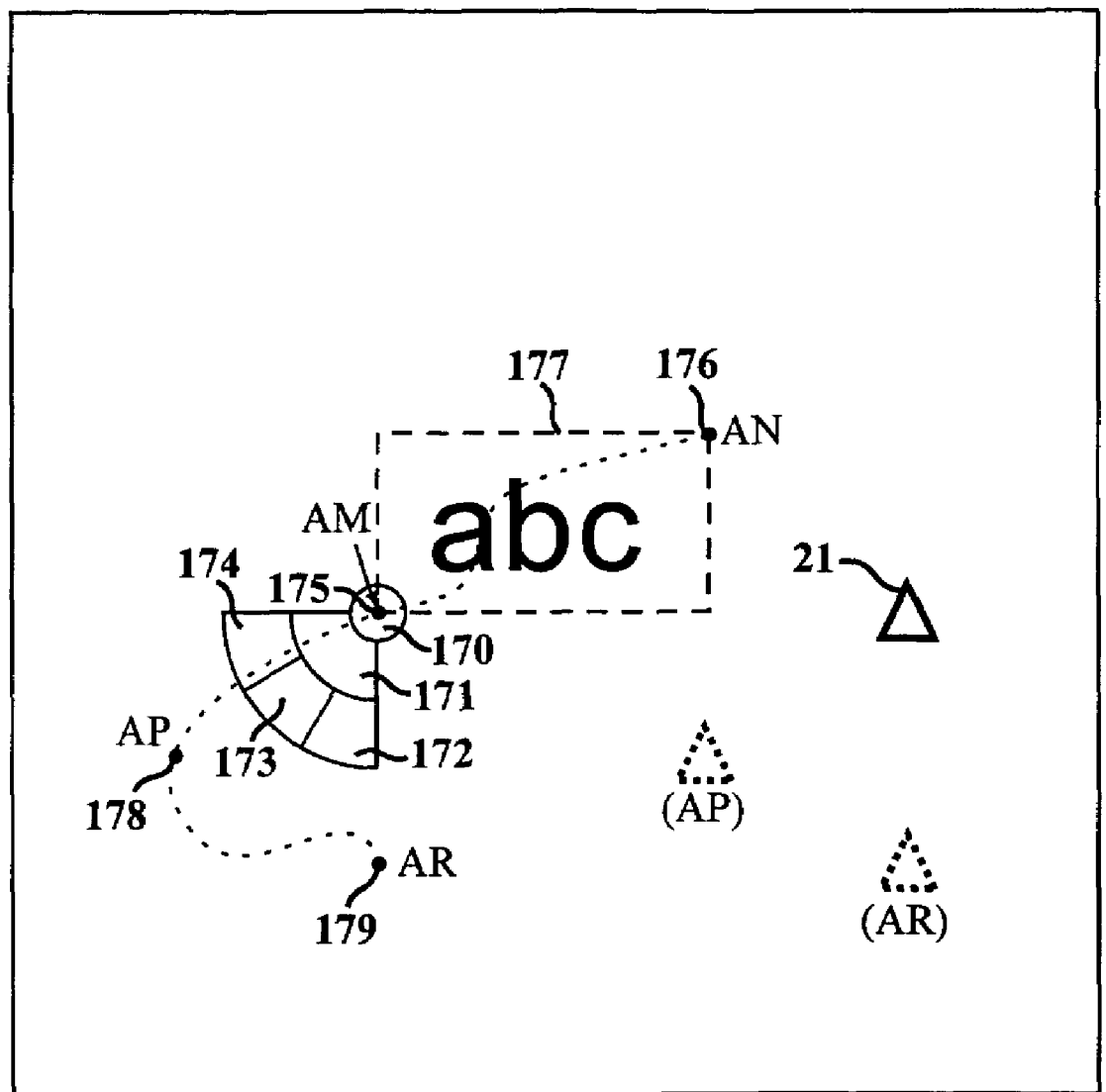
FIG. 14 shows an example of a roll-out combination tool that works in conjunction with an existing activated standard tool-bar command.

The combination-tool "roll-out-navigate-existing" is shown in FIG. 14. The first group, namely Grp1, is selected when the distance 32 between the reference-point 30 and the selection-point 31 is within a predetermined range, such as 0 to 5 pixels. The Grp1 group contains only the function Utilize-existing-tool, which is selected and activates when the angular bearing 33 between the reference-point 30 and the selection-point 31 is within a predetermined range, such as 0 to 360 degrees. The resulting first region 170 is a circle, as shown in FIG. 14.

The second group, namely Grp2, is selected when the distance 32 between the reference-point 30 and the selection-point 31 is within another predetermined range, such as 6 to 15 pixels. The Grp2 group contains only the function Zoom-out-point, which is selected and activates when the angular bearing 33 between the reference-point 30 and the selection-point 31 is within a predetermined range, such as 180 to 270 degrees. The resulting second region 171 is a segment of a ring, as shown in FIG. 14.

The third group, namely Grp3, is selected when the distance 32 between the reference-point 30 and the selection-point 31 is within another predetermined range, such as 16 to 25 pixels. The Grp3 group contains three functions, Dynamic-zoom-reference-point, Zoom-in-rectangle, and Dynamic-pan. The function Dynamic-zoom-reference-point is selected and activates when the angular bearing 33 between the reference-point 30 and the selection-point 31 is within a predetermined range, such as 180 to 210 degrees. The resulting third region 172 is a portion of a ring, as shown in FIG. 14. The function Zoom-in-rectangle is selected and activates when the angular bearing 33 between the reference-point 30 and the selection-point 31 is within a predetermined range, such as 211 to 240 degrees. The resulting fourth region 173 is a portion of a ring, as shown in FIG. 14. The function Dynamic-pan is selected and activates when the angular bearing 33 between the reference-point 30 and the selection-point 31 is within a predetermined range, such as 241 to 270 degrees. The resulting fifth region 174 is a portion of a ring, as shown in FIG. 14.

The repeat mode is set to "many" unless overridden. A graphic depicting possible selection regions appears translucent overtop of the other graphics in the display window 20.

The function Utilize-existing-tool allows an existing active tool to behave normally by doing nothing when the mouse button is held; thereby, the display window 20 is effected by the existing active tool. The function Utilize-existing-tool causes the combination-tool's possible-regions graphic to disappear when the selection-point 31 is "rolled-out" of the region associated with this function, and the existing active tool may now utilize the entire display window 20. The function Utilize-existing-tool allows an existing active tool to behave normally by doing nothing when the mouse button was Released, R-P-R, R-P-R-P-R, or R-P-R-P-R-P-R; thereby, the display is effected by the existing active tool's action for releasing a mouse button.

Further in FIG. 14 an example where, a user toggles the mentioned combination-tool on by pressing-and-releasing a pull-down menu or standard tool-bar icon, then activates "draw a text box" command by pressing-and-releasing a standard tool-bar icon. The user positions the cursor 14 to an arbitrarily location at point AM 175 then presses-and-holds the mouse button causing the possible-regions graphic to appear. The user then drags to location AN 176. Along the way, the selection-point 31 "rolls-out" of the region 170 associated with the Utilize-existing-tool function; thereby, the possible-regions graphic disappears and the previously activated "draw a text box" command 177 continues as usual by allowing the user to enter keyboard presses after stretching the rectangle and releasing the mouse button. Alternatively, the user instead drags the cursor 14 to location AP 178. Along the way, the selection-point 31 rolled-off of the Zoom-out-point region 171 then "rolled-out" of the Dynamic-pan region 174; thereby, the user may now continue to drag the cursor 14 to location AR 179 while the graphics in the display window 20 pan from the reference-point 30 to the selection-point 31.

In summary, a user may activate a number of navigation, or other, tools while working with a repeating pre-activated tool-bar tool, by only pressing-and-dragging the cursor 14 out of a small region relative to the start of the drag. Pressing-and-releasing without moving, as well as, the majority of the area to drag out of, takes on the usual actions associated with the standard pre-activated tool. The mentioned combination-tool is very simple and therefore quick to learn and adopt for both advanced and novice users.

In another preferred embodiment of the present invention, a user may create their own customized combination tool through a dialog box where the number of groups, sizes, and number of regions for each group, are defined. The borders of the regions are drug to the desired size and position. In each region, function's actions for each method of activation (held, released, R-P-R, etc.) are chosen from a list box or dragged and dropped from a group of icons. The default repeat-mode may be selected as "Once" or "Many", as well as the translucency of the graphic that depicts the regions. Short-cut keyboard presses to activate the combination tool may be defined, such as pressing-and-holding the shift key to activate a combination tool dealing with selection of graphical objects, then releasing the shift key to return to a previous combination-tool that deals with effecting selected objects by moving, copying, patterning, mirroring, altering hue, contrast, line thickness, zooming, panning, rotating, etc.

The "rolled-out" definition described hereinabove, behaves similarly to a "clone-function" that emulates characteristics of a previously selected function associated with the region from which the selection-point 31 came, therefore, regions associated with clone-functions are considered within the spirit of the "Rolled-out" concept.

Specific preferred embodiments of the present invention are described hereinabove; it is to be understood that the invention is not limited to those particular embodiments, and one skilled in the art may make various changes and modifications without departing the form the scope or the spirit of the invention as it is defined in the attached claims.

I claim:

1. A display system, comprising:
   a screen display for displaying graphical content further comprising data content; and
   an input device means, for defining a fixed reference point location and a movable current point location on said screen display; and
   a programmable controller operative to provide a first function region having a predetermined shape spatially relative to and containing said reference point location and second and third function regions each contiguous with at least one previously provided function region;
   wherein at least three function regions are each assigned a substantially different corresponding specific function, and
   each of said specific functions comprises one or more corresponding operations, and
   said programmable controller is operative to selectively actuate one or more said operations, the determined operations being selected based on, but not limited to, said current point location being within said corresponding function region, and
   at least one of all said plural operations is operable to continuously modify said displayed data content based on, but not limited to, both said reference point location and said current point location,
   whereby, a user may press and drag into different regions of a display to perform different operations such as panning, rotating, zooming, or others without having to first select the function with an additional user action such as a key press, click of an icon, pausing the motion of a cursor.

2. A display system according to claim 1 wherein said programmable controller is operative to provide a forth function region contiguous with at least one previously provided function region.

3. A display system according to claim 2 wherein said programmable controller is operative to provide a total of more than four function regions each contiguous with at least one previously provided function region.

4. A display system according to claim 3 wherein said reference point location is defined and fixed at a displayed cursor location in response to a user depressing and holding a button and said current point location is defined at the current displayed cursor location in response to said user moving said cursor and maintaining said button in a depressed state.

5. A display system according to claim 3 wherein said reference point location is defined and fixed at the location of a touch point in response to a user touching and holding a touch sensitive screen, and said current point location is defined at the current location of said touch in response to said user sliding said touch point to another location on said touch sensitive screen and in contact therewith.

6. A display system according to claim 4 wherein said first function region is assigned a specific function comprising an operation with behavior selected from the group consisting of pan, zoom, rotate, select, undo, and sharpen.

7. A display system according to claim 6 wherein said second region and said third region are each assigned a specific function comprising an operation with behavior selected from the group consisting of pan, zoom, rotate, draw, stretch, forward, reverse, move, and copy.

8. A display system according to claim 7 wherein said zoom function not assigned to said first region comprises an operation operable to magnify and display a portion of said data content delineated by a rectangle, in response to releasing said button, where opposite corners of said rectangle are defined by said reference point location and said current point location.

9. A display system according to claim 8 wherein said pan function not assigned to said first region comprises an operation operable to continuously display said data content panned from said reference point location to said current point location indicating direction and extent of panning, and permanently pan said data content in response to said user releasing said button.

10. A display system according to claim 9 wherein said zoom function assigned to said first region comprises an operation operable to zoom out displayed data content by a predefined ratio in response to said user releasing said button, such that previously non-visible data content is displayed.

11. A display system according to claim 10 wherein said zoom function assigned to said first region further comprises an operation operable to zoom out full in response to said user releasing depressing and releasing said button within a predetermined time, such that all said data content is displayed on said display screen.

12. A display system according to claim 1 wherein said programmable controller is operative to provide a total of three or more function regions each contiguous with at least one previously provided function region, and
   at least one said operation is selectively actuated in response to said current point location exiting said corresponding function region without entering any contiguous function regions, namely rolled-out.

13. A display system according to claim 12 wherein said rolled-out function comprises an operation operable to eliminate all said function regions, thereby preventing selection and actuation of another function, and
   said rolled-out function comprises an operation operable to continuously modify the displayed data content based on, but not limited to, both said reference point location and said current point location, whereby a user may press and drag a distance out of a region to select and activate a function such as pan, zoom, rotate or others, and then continue the same drag anywhere on the screen while the activated function modifies the data content or how the data content is displayed.

14. A display system, comprising:
a screen display for displaying graphical content further comprising data content; and
an input device means, for defining a fixed reference point location and a movable current point location on said screen display, where said current point location is defined by dragging; and
a first means for providing a predetermined sized first region spatially relative to and containing said reference point location; and
a second means for zooming out said data content in response to completing said drag while said current point location is within said first region, thereby previously non-visible data content is displayed; and
a third means for magnifying and displaying a selected portion of said data content in response to completing said drag while said current point location is outside of said first region, where said reference point location and said current point location define the size and position of said selected portion;
whereby, a user may press and release an arbitrary location without dragging to zoom out, or the user may press and drag beyond a region's boundary to draw a rectangle of interest then release to zoom in, without having to first select either a zoom in or a zoom out function by way of an additional user action such as a key press, click of an icon, gesture, marking menu stroke, or pausing.

15. A display system according to claim 14 wherein said selected portion having a rectangular shape.

16. A display system according to claim 15 wherein said selected portion having corners at said reference point location and said current point location.

17. A display system according to claim 14 wherein said reference point is any arbitrary pointer location chosen by a user, where said arbitrary pointer location not having a previously defined selectable item,
whereby a user is able to start a drag from any area not already occupied by functions such as menus, icons, and program shortcuts.

18. A display system, comprising:
a screen display for displaying graphical content further comprising data content; and
an input device means for defining a fixed reference point location and a movable current point location on said screen display, and
a programmable controller operative to provide a first function region containing said reference point location and further providing two or more additional function regions contiguous with at least one previously provided function region;
wherein at least three of said function regions are assigned substantially different corresponding functions, and
each of said functions comprises one or more corresponding operations, and
said programmable controller is further operative to selectively actuate at least one said operation in response to said current point location exiting the corresponding function region without entering a contiguous function region, namely rolled-out;
whereby a user may press an arbitrary location to display pop-up menu items, then drag out of the desired item's region to actuate it, such as pop-up new menu items or actuate a file save operation.

19. A display system according to claim 18 wherein at least one said rolled-out operation is operable to continuously modify the displayed data content based on, but not limited to, both said reference point location and said current point location;
whereby a user may press to display tool choices, then drag out of the desired tool's region to activate it, and continue the same drag while the tool utilizes the reference point and current point locations, such as drawing a rectangle of interest, then finally worn in on the rectangle upon completing the drag by releasing.

20. A display system according to claim 19 wherein at least one said rolled-out function comprises an operation further operable to eliminate all said function regions, thereby preventing selection and actuation of a different function,
whereby a user may utilize all areas of the screen for the active operation.

21. A display system according to claim 20 wherein at least one of said rolled-out function's behavior is selected from the group consisting of pan, rotate, and zoom.

22. A display system according to claim 18 wherein said programmable controller is further operative to selectively actuate at least one said operation in response to releasing while said current point location is within the corresponding function region,
whereby a user may press-release without dragging to actuate the first function, or the user may press-drag into the region of a function of interest and release to actuate it.

* * * * *